US007835411B2

(12) United States Patent
Masuda et al.

(10) Patent No.: US 7,835,411 B2
(45) Date of Patent: Nov. 16, 2010

(54) LASER FREQUENCY STABILIZING DEVICE, METHOD AND PROGRAM

(75) Inventors: Hiroki Masuda, Tsukuba (JP); Kaoru Miyata, Tsukuba (JP); Hisayoshi Sakai, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 20 days.

(21) Appl. No.: 12/402,573

(22) Filed: Mar. 12, 2009

(65) Prior Publication Data

US 2009/0232172 A1 Sep. 17, 2009

(30) Foreign Application Priority Data

Mar. 12, 2008 (JP) ............................. 2008-062737

(51) Int. Cl.
*H01S 3/13* (2006.01)
(52) U.S. Cl. ..................... 372/29.02; 372/20; 372/23; 372/27; 372/28; 372/29.01; 372/29.014
(58) Field of Classification Search ................... 372/20, 372/23, 27, 28, 29.01, 29.014, 29.02
See application file for complete search history.

(56) References Cited

U.S. PATENT DOCUMENTS

| | | | |
|---|---|---|---|
| 3,517,330 A | 6/1970 | Doyle et al. | |
| 3,530,402 A | 9/1970 | Doyle et al. | |
| 5,014,278 A | 5/1991 | Deki | |
| 5,068,864 A | 11/1991 | Javan | |
| 5,428,700 A | 6/1995 | Hall | |

(Continued)

FOREIGN PATENT DOCUMENTS

EP 1744414 1/2007

(Continued)

OTHER PUBLICATIONS

English language Abstract of JP 2001-274495 A (Oct. 5, 2001).

(Continued)

*Primary Examiner*—Tod T Van Roy
*Assistant Examiner*—Yuanda Zhang
(74) *Attorney, Agent, or Firm*—Greenblum & Bernstein, P.L.C.

(57) ABSTRACT

A laser frequency stabilizing device comprises a laser light producer operative to produce and emit a laser light containing a first and a second longitudinal mode light having different wavelengths; a spectrometer operative to spectrally decompose the laser light into the first longitudinal mode light and the second longitudinal mode light; a first detector operative to detect the light output signal from a absorption cell; a second and third detector operative to detect the signal intensity of the first and second longitudinal mode light; an actuator operative to change the resonant cavity length; a first drive controller operative to detect the saturated absorption signal from the light output signal detected at the first detector and control driving the actuator based on the saturated absorption signal; a second drive controller operative to control driving the actuator such that the signal intensity of the first longitudinal mode light detected at the second detector and the signal intensity of the second longitudinal mode light detected at the third detector have a ratio of a certain value; and a switcher operative to switch the control of the detector between the control by the first drive controller and the control by the second drive controller.

17 Claims, 2 Drawing Sheets

U.S. PATENT DOCUMENTS

| | | | |
|---|---|---|---|
| 6,009,111 A * | 12/1999 | Corwin et al. | 372/32 |
| 6,477,190 B1 * | 11/2002 | Komiyama et al. | 372/34 |
| 6,483,956 B1 * | 11/2002 | Shevy et al. | 385/11 |
| 6,693,932 B2 * | 2/2004 | Akashi et al. | 372/32 |
| 7,613,216 B2 * | 11/2009 | Nakagawa | 372/32 |
| 2002/0136249 A1 * | 9/2002 | Akashi et al. | 372/29.02 |
| 2005/0190803 A1 * | 9/2005 | Gronbach | 372/29.02 |
| 2007/0008995 A1 | 1/2007 | Oozeki et al. | |

FOREIGN PATENT DOCUMENTS

| | | |
|---|---|---|
| JP | 2-86180 | 3/1990 |
| JP | 2000-261092 | 9/2000 |
| JP | 2001-274495 A | 10/2001 |

OTHER PUBLICATIONS

English language Abstract of JP 2000-261092, Sep. 22, 2000.
English language Abstract of JP 2-86180, Mar. 27, 1990.
Bondarenko, "Stabilized two-frequency He + Ne laser for 0.63 micrometres wavelength", Instruments and Experimental Techniques, 1978, XP001669443.

* cited by examiner

LASER FREQUENCY STABILIZING DEVICE, METHOD AND PROGRAM

CROSS-REFERENCE TO RELATED APPLICATION

This application is based upon and claims the benefit of priority from the prior Japanese Patent Application No. 2008-62737, filed on Mar. 12, 2008, the entire contents of which are incorporated herein by reference.

BACKGROUND OF THE INVENTION

1. Field of the Invention

The present invention relates to a laser frequency stabilizing device, laser frequency stabilizing method and laser frequency stabilizing program for changing the resonant cavity length based on a light output signal to stabilize the oscillation frequency of a laser light.

2. Description of the Related Art

A continuous-wave oscillation, 532-nm range solid laser uses a Nd:YAG crystal or the like as a gain medium, which is pumped with a semiconductor laser. The wavelength of such the solid laser is utilized as the standard for lengths. An actual measurement using a wavelength of the laser light requires oscillations of the laser at a single frequency, that is, in a single longitudinal mode.

Further, the use of the laser light wavelength for length measurement requires higher frequency stability of the laser light in order to reduce uncertainty of the length measurement. In an iodine-stabilized laser using an iodine molecular absorption line spectrometry, the oscillation frequency can be controlled at the center of a saturated absorption signal to produce a laser light with high frequency stability (see, for example, Patent Document 1: JP 2001-274495A).

The device in Patent Document 1, however, modulates the resonant cavity length and controls the oscillation frequency of the laser light to capture the saturated absorption signal. Therefore, modulation takes place in the oscillation frequency of the laser light for use in length measurement and so forth. In a word, in the prior art, the influence of the modulation associated with the measurement of the saturated absorption signal may deteriorate the measurement accuracy and so forth as a problem.

To overcome the above problem, there has been proposed a configuration in the art, which includes a modulator such as an electro-optic modulator (EOM). The configuration uses an expensive optical element, which elevates the cost.

Therefore, the present invention has an object to provide a laser frequency stabilizing device, laser frequency stabilizing method and laser frequency stabilizing program capable of eliminating the influence of modulation at lower costs.

SUMMARY OF THE INVENTION

The present invention provides a laser frequency stabilizing device capable of establishing resonance of a pumping light in a resonant cavity to produce and emit a laser light, applying the laser light to an absorption cell to generate a light output signal, and varying the resonant cavity length based on a saturated absorption signal contained in the light output signal to stabilize the oscillation frequency of the laser light, the device comprising: a laser light producer operative to produce a laser light containing a first longitudinal mode light and a second longitudinal mode light having different wavelengths; a spectrometer operative to spectrally decompose the laser light emitted from the laser light producer into the first longitudinal mode light and the second longitudinal mode light; a first detector operative to detect the light output signal from the absorption cell; a second detector operative to detect the signal intensity of the first longitudinal mode light; a third detector operative to detect the signal intensity of the second longitudinal mode light; an actuator operative to change the resonant cavity length; a first drive controller operative to detect the saturated absorption signal from the light output signal detected at the first detector and control driving the actuator based on the saturated absorption signal; a second drive controller operative to control driving the actuator such that the signal intensity of the first longitudinal mode light detected at the second detector and the signal intensity of the second longitudinal mode light detected at the third detector have a ratio of a certain value; and a switcher operative to switch the control of the actuator between the control by the first drive controller and the control by the second drive controller.

With such the configuration, the laser frequency stabilizing device can stabilize the frequency without modulating the resonant cavity length.

Preferably, the laser light producer may be configured to produce and emit a first longitudinal mode light and a second longitudinal mode light having adjacent peak wavelengths and mutually orthogonal planes of polarization. Preferably, the switcher may be configured to switch the control by the first drive controller to the control by the second drive controller for control of the actuator when the saturated absorption signal detected at the first detector meets the oscillation frequency of the laser light. Preferably, the first drive controller may be configured to control the actuator on the basis of at least one of a second order differential signal derived from the light output signal and a third order differential signal derived from the light output signal.

The present invention provides a laser frequency stabilizing method capable of establishing resonance of a pumping light in a resonant cavity to produce a laser light, applying the laser light to an absorption cell to generate a light output signal, and varying the resonant cavity length based on a saturated absorption signal contained in the light output signal to stabilize the oscillation frequency of the laser light, the method comprising: controlling the resonant cavity length based on the light output signal from the absorption cell; and detecting a first longitudinal mode light and a second longitudinal mode light contained in the laser light and having different wavelengths to control the resonant cavity length such that the signal intensity based on the first longitudinal mode light and the signal intensity based on the second longitudinal mode light have a ratio of a certain value.

The present invention provides a laser frequency stabilizing program capable of establishing resonance of a pumping light in a resonant cavity to produce a laser light, applying the laser light to an absorption cell to generate a light output signal, and varying the resonant cavity length based on a saturated absorption signal contained in the light output signal to stabilize the oscillation frequency of the laser light, the program comprising computer-executable steps of: controlling the resonant cavity length based on the light output signal from the absorption cell; and detecting a first longitudinal mode light and a second longitudinal mode light contained in the laser light and having different wavelengths to control the resonant cavity length such that the signal intensity based on the first longitudinal mode light and the signal intensity based on the second longitudinal mode light have a ratio of a certain value.

DETAILED DESCRIPTION OF THE EMBODIMENTS

A laser frequency stabilizing device according to an embodiment of the present invention will now be described with reference to the drawings.

(Configuration of Laser Frequency Stabilizing Device According to Present Embodiment)

Figure 1:
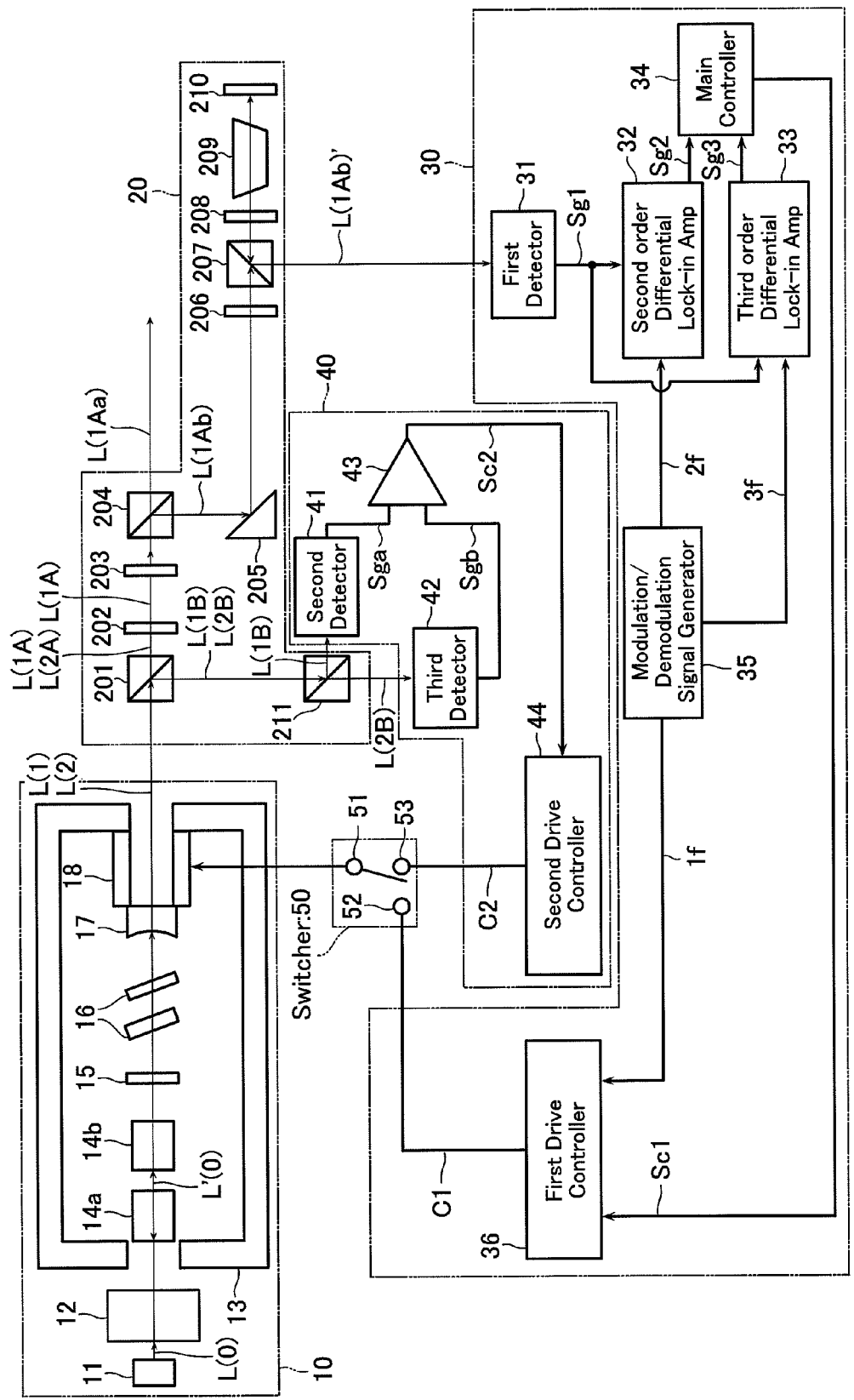
FIG. 1 is a brief block diagram of a laser frequency stabilizing device according to an embodiment of the present invention.

A configuration of the laser frequency stabilizing device according to the embodiment of the present invention is described. FIG. 1 is a brief block diagram of the laser frequency stabilizing device according to the embodiment of the present invention. As shown in FIG. 1, the laser frequency stabilizing device comprises a laser light producer 10, a laser light spectrometer 20, a first controller 30, a second controller 40, and a switcher 50. The laser light producer 10 has a function of producing a laser light. The laser light spectrometer 20 has a function of spectrally decomposing the laser light produced at the laser light producer 10. The first controller 30 and the second controller 40 have a function of detecting the laser light and controlling the oscillation frequency of the laser light. The switcher 50 has a function of switching between the control by the first controller 30 and the control by the second controller 40 for frequency control of the laser light.

The laser light producer 10 includes a pumping semiconductor laser 11, a beam shaping system 12, and a cabinet 13. The pumping semiconductor laser 11 is supplied with a certain current to emit a light L(0) having a wavelength of 808 nm. The beam shaping system 12 includes plural optical members. The beam shaping system 12 guides the light L(0) therethrough from the pumping semiconductor laser 11 to the cabinet 13.

Inside the cabinet 13, a Nd:YVO4 crystal 14a, a KTP crystal 14b, a wavelength plate 15, an etalon 16, a reflecting mirror 17, and an actuator 18 are sequentially arranged on the optical path of the light L(0).

The Nd:YVO4 crystal 14a is a crystal for diode-laser-pumped solid laser. The Nd:YVO4 crystal 14a emits a 1064-nm wavelength light L'(0) by stimulated radiation on application of the light L(0) to excite Nd atoms. The Nd:YVO4 crystal 14a is coated to reflect the light L'(0) toward the side of the beam shaping system 12.

The KTP crystal 14b is a non-linear optical crystal. The KTP crystal 14b converts part of the light L'(0) by stimulated radiation into a secondary harmonic or a 532-nm light.

The wavelength plate 15 phase-shifts the axis of the vertical polarization of the light L'(0) to change the polarization of the light L'(0).

The etalon 16 includes high-reflection filters arranged face to face. The etalon 16 has a frequency filer function and is previously adjusted to produce two lights (a first and a second longitudinal mode light) having different frequencies (wavelengths), more specifically, a first and a second longitudinal mode light having adjacent peak wavelengths.

The reflecting mirror 17 is coated to reflect the light L'(0) therefrom and transmit the 532-nm wavelength light therethrough. Therefore, the Nd:YVO4 crystal 14a and the reflecting mirror 17 configure a resonant cavity only for the light L'(0).

The actuator 18 includes a piezoelectric element. The actuator 18 is provided between the cabinet 13 and the reflecting mirror 17. The actuator 18 deforms (expands and contracts) in response to the voltage applied thereto. In a word, with the deformation, the actuator 18 shifts the reflecting mirror 17 relative to the Nd:YVO4 crystal 14a to change the resonant cavity length.

The laser light producer 10 with the adjusted etalon 16 produces a first longitudinal mode light L(1) and a second longitudinal mode light L(2) having adjacent peak locations in the wavelength direction. The laser light producer 10 applies the first longitudinal mode light L(1) and the second longitudinal mode light L(2) to the laser light spectrometer 20.

The direction of the polarization of the first longitudinal mode light L(1) is orthogonal to the direction of the polarization of the second longitudinal mode light L(2). For example, the first longitudinal mode light L(1) is a π-light and the second longitudinal mode light L(2) is a σ-light. Alternatively, the first longitudinal mode light L(1) is a σ-light and the second longitudinal mode light L(2) is a π-light, for example.

The laser light spectrometer 20 includes a beam splitter 201, a polarizing plate 202, a ½-wavelength plate 203, a first polarizing beam splitter 204, a prism 205, a ½-wavelength plate 206, a second polarizing beam splitter 207, a ¼-wavelength plate 208, an iodine cell 209, a reflecting mirror 210, and a third polarizing beam splitter 211.

The beam splitter 201 is provided at a position into which the first longitudinal mode light L(1) and the second longitudinal mode light L(2) from the laser light producer 10 enter. The beam splitter 201 splits the first longitudinal mode light L(1) and the second longitudinal mode light L(2). The beam splitter 201 transmits part of the first longitudinal mode light L(1) therethrough as a first longitudinal mode light L(1A) and reflects the remainder therefrom as a first longitudinal mode light L(1B). The beam splitter 201 transmits part of the second longitudinal mode light L(2) therethrough as a second longitudinal mode light L(2A) and reflects the remainder therefrom as a second longitudinal mode light L(2B).

The polarizing plate 202, the ½-wavelength plate 203 and the first polarizing beam splitter 204 are sequentially arranged on the optical path of the first longitudinal mode light L(1A) and the second longitudinal mode light L(2A). The polarizing plate 202 is configured to transmit only the first longitudinal mode light L(1A) therethrough and block the second longitudinal mode light L(2A). The ½-wavelength plate 203 changes the polarization direction of the first longitudinal mode light L(1A) that is a linear polarized light. The first polarizing beam splitter 204 splits the first polarized longitudinal mode light L(1A). The first polarizing beam splitter 204 transmits part of the first polarized longitudinal mode light L(1A) therethrough to produce a first longitudinal mode light L(1Aa) and reflects the remainder therefrom to produce a first longitudinal mode light L(1Ab). The first longitudinal mode light L(1Aa) transmitted through the first polarizing beam splitter 204 is available in length measurement and so forth.

The prism 205 is provided at a position to which the first longitudinal mode light L(1Ab) reflected at the first polarizing beam splitter 204 is applied. The prism 205 receives the first longitudinal mode light L(1Ab) from the first polarizing beam splitter 204 and reflects it therefrom at a certain angle.

The ½-wavelength plate 206, the second polarizing beam splitter 207, the ¼-wavelength plate 208, the iodine cell 209, and the reflecting mirror 210 are sequentially arranged on the optical path of the first longitudinal mode light L(1Ab) reflected at the prism 205.

With the above configuration, the first longitudinal mode light L(1Ab) is applied, through the ½-wavelength plate 206, the second polarizing beam splitter 207, the ¼-wavelength plate 208 and the iodine cell 209, to the reflecting mirror 210. Subsequently, the first longitudinal mode light L(1Ab) travels through the iodine cell 209 and the ¼-wavelength plate 208 and is reflected at the second polarizing beam splitter 207. On the above optical path, the first longitudinal mode light L(1Ab) transmits through the iodine cell 209, which absorbs light within a specific frequency range to yield an absorption light L(1Ab)'.

The third polarizing beam splitter 211 is arranged on the optical path of the first longitudinal mode light L(1B) and the second longitudinal mode light L(2B). The third polarizing beam splitter 211 spectrally decomposes the first longitudinal mode light L(1B) and the second longitudinal mode light L(2B). The third polarizing beam splitter 211 reflects the first longitudinal mode light L(1B) therefrom and transmits the second longitudinal mode light L(2B) therethrough.

The first controller 30 includes a first detector 31, a second order differential lock-in amp 32, a third order differential lock-in amp 33, a main controller 34, a modulation/demodulation signal generator 35, and a first drive controller 36.

The first detector 31 detects the absorption light L(1Ab)' incoming from the second polarizing beam splitter 207. The first detector 31 produces a light output signal Sg1 based on the detected absorption light L(1Ab)'. The first detector 31 provides the light output signal Sg1 to the second order differential lock-in amp 32 and the third order differential lock-in amp 33.

The second order differential lock-in amp 32 demodulates the input of the light output signal Sg1 with a 2f-Hz frequency to produce a second order differential signal Sg2. The second order differential lock-in amp 32 provides the produced second order differential signal Sg2 to the main controller 34.

The third order differential lock-in amp 33 demodulates the input of the light output signal Sg1 with a 3f-Hz frequency to produce a third order differential signal Sg3. The third order differential lock-in amp 33 provides the produced third order differential signal Sg3 to the main controller 34.

The main controller 34 may comprise a PC (Personal Computer). The main controller 34 includes a storage unit to store various programs. The main controller 34 controls the frequency of the laser light in accordance with the stored various programs. The main controller 34 controls the state of the switcher 50 based on the input of the second order differential signal Sg2 and the third order differential signal Sg3. The main controller 34 produces a first actuator control signal Sc1 based on the input of the third order differential signal Sg3. The first actuator control signal Sc1 is fed to the first drive controller 36 to control the first drive controller 36.

The modulation/demodulation signal generator 35 provides a 1f-Hz frequency signal to the first drive controller 36. The modulation/demodulation signal generator 35 provides a signal having a 2f-Hz frequency to the second order differential lock-in amp 32. The modulation/demodulation signal generator 35 provides a 3f-Hz frequency signal to the third order differential lock-in amp 33.

The first drive controller 36 produces a first control voltage C1 based on the first actuator control signal Sc1 and the 1f-Hz frequency signal and applies the first control voltage C1 to the switcher 50. The first control voltage C1 is a voltage modulated with the 1f-Hz frequency. In other word, in the above configuration, the first drive controller 36 controls the actuator 18 based on the third order differential signal Sg3 derived from the light output signal Sg1.

The second controller 40 includes a second detector 41, a third detector 42, a differential amp 43, and a second drive controller 44.

The second detector 41 detects the first longitudinal mode light L(1B) incoming from the third polarizing beam splitter 211. The second detector 41 produces a first mode signal Sga based on the first detected longitudinal mode light L(1B). The second detector 41 provides the first mode signal Sga to the differential amp 43.

The third detector 42 detects the second longitudinal mode light L(2B) incoming from the third polarizing beam splitter 211. The third detector 42 produces a second mode signal Sgb based on the second detected longitudinal mode light L(2B). The third detector 42 provides the second mode signal Sgb to the differential amp 43.

The differential amp 43 leads the first mode signal Sga and the second mode signal Sgb to differential amplification to produce a second actuator control signal Sc2. The second actuator control signal Sc2 is a signal for control of the second drive controller 44. The second actuator control signal Sc2 is a signal indicative of a ratio between the signal intensity of the first mode signal Sga and the signal intensity of the second mode signal Sgb. The differential amp 43 provides the second actuator control signal Sc2 to the second drive controller 44.

The second drive controller 44 produces a second control voltage C2 based on the second actuator control signal Sc2 and applies the second control voltage C2 to the switcher 50. The second control voltage C2 is a voltage based on the ratio between the signal intensity of the first mode signal Sga and the signal intensity of the second mode signal Sgb.

The switcher 50 has a first through a third terminal 51-53. The first terminal 51 is connected to the actuator 18. The second terminal 52 is supplied with the first control voltage C1. The third terminal 53 is supplied with the second control voltage C2.

In a word, when the switcher 50 connects the first terminal 51 with the second terminal 52, the actuator 18 is placed under the drive control with the first control voltage C1. When the switcher 50 connects the first terminal 51 with the third terminal 53, the actuator 18 is placed under the drive control with the second control voltage C2. The switcher 50 switches between the connections associated with the first through third terminals 51-53 under the control of the main controller 34.

(Adjustment of Etalon 16 According to Present Embodiment)

The following description is given to a method for adjusting the etalon 16 to emit two adjacent longitudinal mode lights L(1B), L(2B) from the above-described laser light producer 10. The adjustment of the etalon 16 maybe executed as follows. First, an optical spectrum analyzer is installed between the beam splitter 201 and the third polarizing beam splitter 211. In addition, a wavelength meter is installed behind the first polarizing beam splitter 204. The installed optical spectrum analyzer is used to read two adjacent longitudinal mode lights L(1B), L(2B), then adjust the rotational angle of the etalon 16 in the resonant cavity such that these longitudinal mode lights L(1B), L(2B) can be emitted, and thereafter adjust the first longitudinal mode light L(1A) to have a desired frequency based on a measurement result from a wavelength meter.

(Control in Laser Frequency Stabilizing Device According to Present Embodiment)

Figure 2:
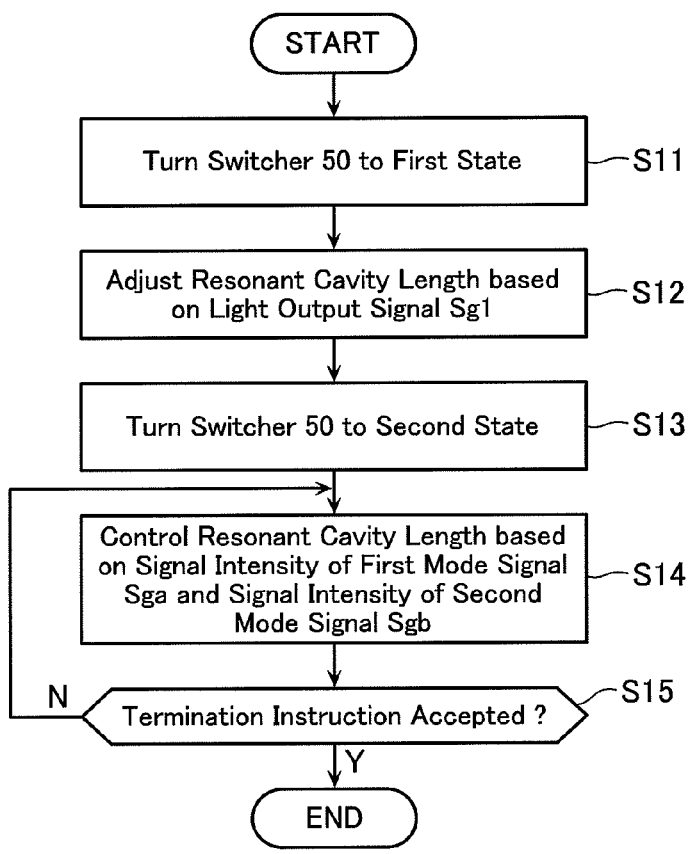
FIG. 2 is a flowchart showing laser frequency stabilizing control in the laser frequency stabilizing device according to the embodiment of the present invention.
Figure 3:
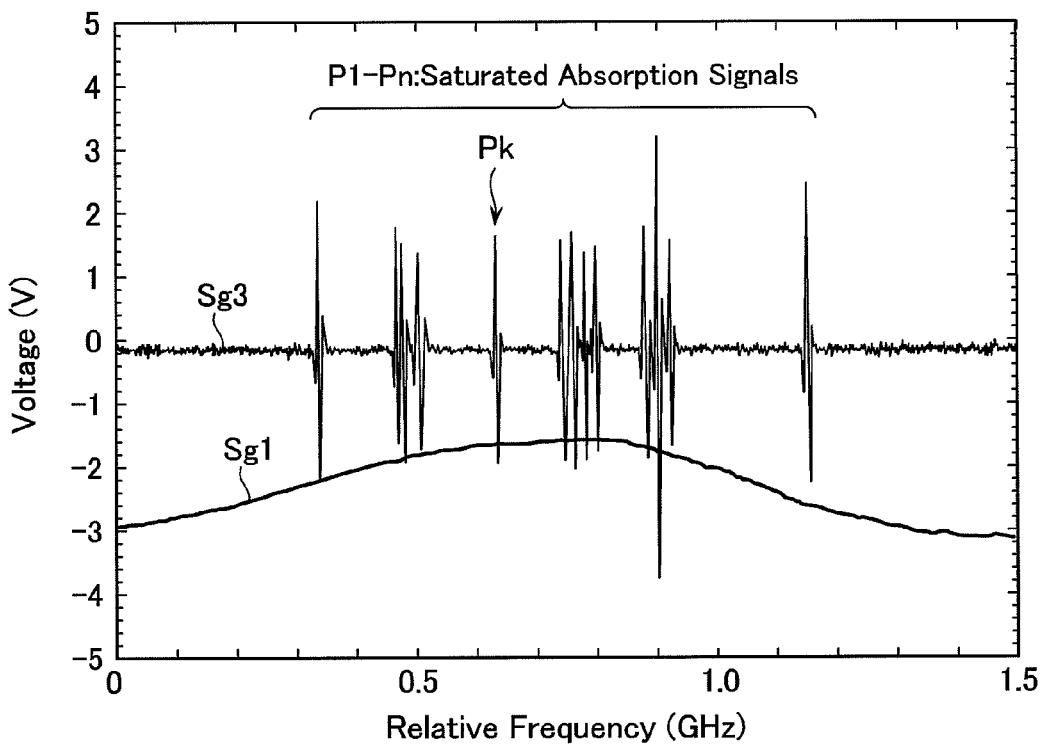
FIG. 3 shows a light output signal Sg1 and a third order differential signal Sg3 detected during control in the laser frequency stabilizing device according to the embodiment of the present invention.

The following description is given to the control for stabilizing the laser frequency (laser frequency stabilizing control) in the present embodiment with reference to FIGS. 2 and 3. FIG. 2 is a flowchart illustrative of the laser frequency stabilizing control according to the present embodiment. FIG. 3 shows the light output signal Sg1 and the third order differential signal Sg3.

As shown in FIG. 2, the main controller 34 first turns the switcher 50 to a first state (step S11). The first state is herein defined as a state in which the first terminal 51 is connected with the second terminal 52. In a word, the main controller 34 sets it such that the first drive controller 36 controls the actuator 18.

Subsequently, the first drive controller 36 controls driving the actuator 18 based on the light output signal Sg1 (step S12). In a word, the first drive controller 36 controls the resonant cavity length based on the light output signal Sg1.

In the control at the above step S12, the first drive controller 36 first drives the actuator 18 to measure the third order differential signal Sg3 within a certain frequency region. With this measurement, as shown in FIG. 3, plural saturated absorption signals P1-Pn (n is a natural number) having peaks and valleys can be observed in the third order differential signal Sg3 within a certain frequency region.

The first drive controller 36 then drives the actuator 18 to set the oscillation frequency of the third order differential signal Sg3 to meet the central frequency of an arbitrary saturated absorption signal Pk. Thus, the first longitudinal mode light L(1Aa) for use in length measurement has an oscillation frequency coincident with the central frequency of the set saturated absorption signal Pk. The first control voltage C1 output from the first drive controller 36 is modulated with the 1f-Hz frequency signal. Therefore, the first longitudinal mode light L(1Aa) becomes a modulated light.

Next, the main controller 34 turns the switcher 50 to a second state (step S13). The second state is herein defined as a state in which the first terminal 51 is connected with the third terminal 53. In a word, the main controller 34 sets it such that the second drive controller 44 controls the actuator 18.

Subsequently, the second drive controller 44 controls driving the actuator 18 based on the signal intensity of the first mode signal Sga and the signal intensity of the second mode signal Sgb (step S14). In a word, the second drive controller 44 controls the resonant cavity length based on the signal intensity of the first mode signal Sga and the signal intensity of the second mode signal Sgb. The second drive controller 44 controls it such that the signal intensity of the first mode signal Sga and the signal intensity of the second mode signal Sgb become equal or both have a constant ratio (of a certain value).

Next, the main controller 34 decides whether a termination instruction for terminating the control is accepted (step S15). If the main controller 34 decides that the termination instruction is accepted (step S15, Y), it terminates the control. On the other hand, if the main controller 34 decides that the termination instruction is not accepted (step S15, N), it executes the process at the step S14 repeatedly.

(Effect of Laser Frequency Stabilizing Device According to Present Embodiment)

The following description is given to the effect of the laser frequency stabilizing device according to the present embodiment. As described above, the laser frequency stabilizing device according to the present embodiment measures saturated absorption signals while the first drive controller 36 modulates the resonant cavity length and controls the actuator 18 such that the oscillation frequency of the third order differential signal Sg3 meets the central frequency of an arbitrary saturated absorption signal. Subsequently, the laser frequency stabilizing device controls the actuator 18 using the second drive controller 44 based on the signal intensity of the first mode signal Sga and the signal intensity of the second mode signal Sgb. Thus, the laser frequency stabilizing device according to the present embodiment finally stabilizes the laser frequency without modulating the resonant cavity length. Namely, the laser frequency stabilizing device according to the present embodiment can produce a stabilized laser light not modulated. Accordingly, the use of the laser light makes it possible to achieve high-precision length measurement. In addition, the laser frequency stabilizing device according to the present embodiment requires no expensive optical element and therefore can be produced at a lower cost.

(Other Embodiments)

One embodiment associated with the laser frequency stabilizing device has been described above though the present invention is not limited to the above embodiment but rather can be given various modifications, additions, replacements and so forth without departing from the scope and spirit of the invention.

For example, in the above embodiment, the first drive controller 36 drives the actuator 18 in response to the first actuator control signal Sc1 from the main controller 34 based on the third order differential signal Sg3. The first drive controller 36 is though not limited to the above configuration and may be configured to drive the actuator 18 in response to a control signal from the main controller 34 based on the second order differential signal Sg2. In a word, the first drive controller 36 may be configured to control it based on the light output signal Sg1.

The above embodiment is configured to use the etalon 16 to produce the first longitudinal mode light L(1) and the second longitudinal mode light L(2) though it is not limited to the above configuration. Instead of the etalon 16, a laser tube may be used, which can adjust the resonant cavity length so as to produce the first longitudinal mode light L(1) and the second longitudinal mode light L(2). The laser tube may be equipped with a heater around the outer circumference thereof and may be configured stretchable under the temperature control for the heater.

What is claimed is:

1. A laser frequency stabilizing device capable of establishing resonance of a pumping light in a resonant cavity to produce a laser light, and varying a resonant cavity length to stabilize an oscillation frequency of the laser light, the device comprising:
   a laser light producer operative to produce and emit the laser light containing a first longitudinal mode light and a second longitudinal mode light having different wavelengths;
   a spectrometer operative to spectrally decompose the laser light emitted from the laser light producer into the first longitudinal mode light and the second longitudinal mode light;

an absorption cell for absorbing the first longitudinal mode light decomposed by the spectrometer within a specific frequency range to yield an absorption light;
a first detector operative to detect the absorption light output from the absorption cell;
a second detector operative to detect a signal intensity of the first longitudinal mode light;
a third detector operative to detect a signal intensity of the second longitudinal mode light;
an actuator operative to change the resonant cavity length;
a first drive controller operative to detect a saturated absorption signal contained in the absorption light detected at the first detector and control driving the actuator based on the saturated absorption signal;
a second drive controller operative to control driving the actuator such that the signal intensity of the first longitudinal mode light detected at the second detector and the signal intensity of the second longitudinal mode light detected at the third detector have a ratio of a certain value; and
a switcher operative to switch the control of the actuator between the control by the first drive controller and the control by the second drive controller,
wherein the switcher switches the control by the first drive controller to the control by the second drive controller for control of the actuator when the saturated absorption signal meets the oscillation frequency of the laser light under the control of the first drive controller.

2. The laser frequency stabilizing device according to claim 1, wherein the laser light producer produces and emits a first longitudinal mode light and a second longitudinal mode light having adjacent peak wavelengths and mutually orthogonal planes of polarization.

3. The laser frequency stabilizing device according to claim 1, wherein the first drive controller controls the actuator on the basis of at least one of a second order differential signal derived from the absorption light and a third order differential signal derived from the absorption light.

4. The laser frequency stabilizing device according to claim 1, wherein the absorption cell is an iodine cell.

5. The laser frequency stabilizing device according to claim 1, wherein the laser light producer includes an etalon adjusted to produce the first longitudinal mode light and the second longitudinal mode light.

6. The laser frequency stabilizing device according to claim 1, wherein the laser light producer includes a laser tube adjusted to produce the first longitudinal mode light and the second longitudinal mode light.

7. A laser frequency stabilizing method capable of establishing resonance of a pumping light in a resonant cavity to produce a laser light, and varying a resonant cavity length to stabilize an oscillation frequency of the laser light, the method comprising:
producing the laser light containing a first longitudinal mode light and a second longitudinal mode light having different wavelengths;
decomposing the laser light into the first longitudinal mode light and the second longitudinal mode light;
irradiating an absorption cell with the laser light, the absorption cell absorbing the first longitudinal mode light within a specific frequency range to yield an absorption light;
detecting the absorption light to control the resonant cavity length based on a saturated absorption signal contained in the absorption light;
detecting the first longitudinal mode light and the second longitudinal mode to control the resonant cavity length such that a signal intensity based on the first longitudinal mode light and a signal intensity based on the second longitudinal mode light have a ratio of a certain value; and
switching the control by the absorption light to the control by the first longitudinal mode light and the second longitudinal mode light for control of the resonant cavity length when the saturated absorption signal detected under the control based on the absorption light meets the oscillation frequency of the laser light.

8. The laser frequency stabilizing method according to claim 7, wherein the first longitudinal mode light and the second longitudinal mode light have adjacent peak wavelengths and mutually orthogonal planes of polarization.

9. The laser frequency stabilizing method according to claim 7, further comprising:
controlling the resonant cavity length on the basis of at least one of a second order differential signal derived from the absorption light and a third order differential signal derived from the absorption light.

10. The laser frequency stabilizing method according to claim 7, wherein the absorption cell is an iodine cell.

11. The laser frequency stabilizing method according to claim 7, wherein an etalon is used to produce the first longitudinal mode light and the second longitudinal mode light.

12. The laser frequency stabilizing method according to claim 7, wherein a laser tube is used to produce the first longitudinal mode light and the second longitudinal mode light.

13. A non-transitory computer-readable storage medium encoded with a laser frequency stabilizing program capable of establishing resonance of a pumping light in a resonant cavity to produce a laser light, and varying a resonant cavity length to stabilize an oscillation frequency of the laser light, the program, when executed by a computer, comprising:
producing the laser light containing a first longitudinal mode light and a second longitudinal mode light having different wavelengths;
decomposing the laser light into the first longitudinal mode light and the second longitudinal mode light;
irradiating an absorption cell with the laser light, the absorption cell absorbing the first longitudinal mode light within a specific frequency range to yield an absorption light;
detecting the absorption light to control the resonant cavity length based on a saturated absorption signal contained in the absorption light;
detecting the first longitudinal mode light and the second longitudinal mode light to control the resonant cavity length such that a signal intensity based on the first longitudinal mode light and a signal intensity based on the second longitudinal mode light have a ratio of a certain value; and
switching the control by the absorption light to the control by the first longitudinal mode light and the second longitudinal mode light for control of the resonant cavity length when the saturated absorption signal detected under the control based on the absorption light meets the oscillation frequency of the laser light.

14. The non-transitory computer-readable storage medium encoded with a laser frequency stabilizing program according to claim 13, wherein the first longitudinal mode light and the second longitudinal mode light have adjacent peak wavelengths and mutually orthogonal planes of polarization.

15. The non-transitory computer-readable storage medium encoded with a laser frequency stabilizing program according to claim 13, further comprising:

controlling the resonant cavity length on the basis of at least one of a second order differential signal derived from the absorption light and a third order differential signal derived from the absorption light.

16. The non-transitory computer-readable storage medium encoded with a laser frequency stabilizing program according to claim 13, wherein the absorption cell is an iodine cell.

17. The non-transitory computer-readable storage medium encoded with a laser frequency stabilizing program according to claim 13, wherein an etalon is used to produce the first longitudinal mode light and the second longitudinal mode light.

* * * * *